Patented Apr. 19, 1949

2,467,561

UNITED STATES PATENT OFFICE 2,467,561

ANTHRAQUINONE ACRIDONE CARBAZOLES IN WHICH THE ACRIDONE NUCLEUS IS LINKED TO THE CARBAZOLE NUCLEUS THROUGH AN AMIDE LINKAGE

Fritz Max, Easton, Pa., and David I. Randall, Phillipsburg, N. J., assignors to General Aniline & Film Corporation, New York, N. Y., a corporation of Delaware No Drawing. Application December 12, 1946, Serial No. 715,653

3 Claims. (Cl. 260—276)

The present invention relates to anthraquinone acridone carbazole dyes and more particularly to such dyes in which the acridone nucleus is linked through the 6' position to the 1" position of the carbazole anthraquinone nucleus by an amide linkage.

It has been proposed in the past to produce anthraquinone acridone carbazoles for use as vat dyes. The reported compounds, however, are such that the acridone nucleus is joined to the carbazole nucleus through condensed ring systems.

We have now found a new class of anthraquinone acridone carbazoles in which the anthraquinone acridone nucleus is linked in the 6' position to the 1" position of the carbazole anthraquinone nucleus by an amide linkage. These compounds are capable of dyeing vegetable fibers in deep shades ranging from brown, particularly red-brown, to gray shades of excellent fastness properties.

It is accordingly an object of the persent invention to produce anthraquinone acridone carbazoles in which the acridone nucleus is linked to the carbazole nucleus through an amide linkage.

A further object of the present invention are anthraquinone acridone carbazoles capable of dyeing vegetable fibers in pleasing deep shades of brown to gray in which the acridone nucleus is linked to the carbazole nucleus through an amide linkage.

A further object of the present invention are anthraquinone acridone carbazoles in which the acridone nucleus is linked in 6'-position to the 1"-position of the carbazole anthraquinone nucleus by an amide linkage.

Other and further important objects of the invention will become apparent as the description proceeds.

The compounds the preparation and use of which are contemplated herein may be depicted by the following structural formula:

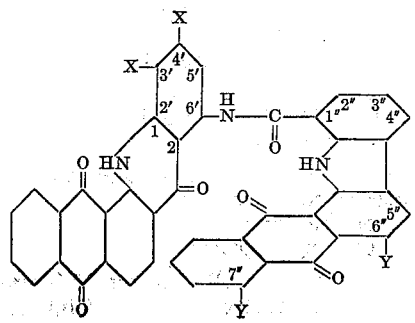

wherein X is hydrogen, alkoxy such as methoxy, ethoxy, propoxy and the like, alkyl such as methyl, ethyl, propyl, butyl, amyl, octyl and the like, aryl such as phenyl, naphthyl and the like, or halogen such as chlorine, bromine, fluorine and the like, and Y is hydrogen or a benzoylamino radical such as benzoylamino, p-methoxy benzoylamino, p-chlorobenzoylamino, p-methyl benzoylamino and the like.

The above products are obtained by condensing an anthraquinone-2.1-(N)-1'.2'-(N)-6-(o-halogen benzoylamido)-benzacridone with a 1-amino anthraquinone which may bear a benzoylamino radical in the 4- or 5- position and ring closing the resulting product. The condensation is effected by heating the reactants to a temperature ranging from about 190 to 250° C. in the presence of an acid acceptor such as soda ash, potassium carbonate, sodium acetate and the like, and copper or a salt of copper such as copper acetate and the like. Suitable benzacridones for use in the condensation are:

Anthraquinone-2.1 - (N)-1'.2'-(N)-6'-(o - chlorbenzoylamido)-benzacridone,
Anthraquinone - 2.1-(N) -1'.2'-(N) -3'-chloro-6'-(o-chlorbenzoylamido)-benzacridone,
Anthraquinone-2.1-(N) -1'.2'-(N) -3'.4'-dichloro-6'-(o-chlorbenzoylamido)-benzacridone.
Anthraquinone-2.1-(N) -1'.2'-(N) -3'-methoxy-6'-(o-chlorbenzoylamido)-benzacridone,
Anthraquinone-2.1-(N) -1'.2' - (N) -3'-phenyl-6'-(o-chlorbenzoylamido)-benzacridone,
Anthraquinone - 2.1 - (N) -1'.2'-(N) -3'-phenoxy-6'-(o-chlorbenzoylamido)-benzacridone,
Anthraquinone-2.1-(N) -1'.2'-(N) -3'-bromo -6' -(o-chlorbenzoylamido)-benzacridone,
Anthraquinone-2.1-(N) -1'.2'-(N) -3'.4' - dimethoxy-6'-(o-chlorbenzoylamido)-benzacridone,
Anthraquinone-2.1-(N) -1'.2'-(N) -4'-phenyl - 6'-(o-chlorbenzoylamido)-benzacridone,
Anthraquinone - 2.1 - (N) -1'.2'-(N) -3'-ethyl-6'-(o-chlorbenzoylamido)-benzacridone,
Anthraquinone-2.1-(N) -1'.2'-(N) -3'.4'-dimethyl-6'-(o-chlorbenzoylamido)-benzacridone,
Anthraquinone-2.1-(N) -1'.2'-(N) -4'-propyl - 6'-(o-chlorbenzoylamido)-benzacridone, and the like.

Suitable 1-amino anthraquinones are:

1-amino anthraquinone
1-amino-4-benzoylamino anthraquinone
1-amino-5-benzoylamino anthraquinone
1 - amino-4-p-methyl benzoylamino anthraquinone
1-amino-5-p-chlorobenzoylamino anthraquinone 1-amino-5-p-methoxy benzoylamino anthraquinone and the like.

The ring closure of the condensation product of the benzacridone and the 1-amino anthraquinone is effected by heating the intermediate condensation product to a temperature of about 50 to 125° C. in the presence of an acid condensing agent. The acid condensing agent may be an acid such as concentrated sulfuric acid, chlorsulfonic acid and the like, but we prefer to employ an acid-reacting metal chloride in the presence of a non-basic organic solvent. As metal chlorides there may be used aluminum chloride, ferric chloride and the like. Suitable non-basic organic solvents are nitrobenzene, toluene, dinitrobenzene, tetrachlorethane, chlorbenzene, etc.

The course of the reaction, while utilizing as the parent materials, anthraquinone-2.1-(N)-1',2'-(N)-3'-chloro-6'-(o-chlorbenzamido)-benzacridone and 1-amino-5-benzoylamino anthraquinone is illustrated by the following equation:

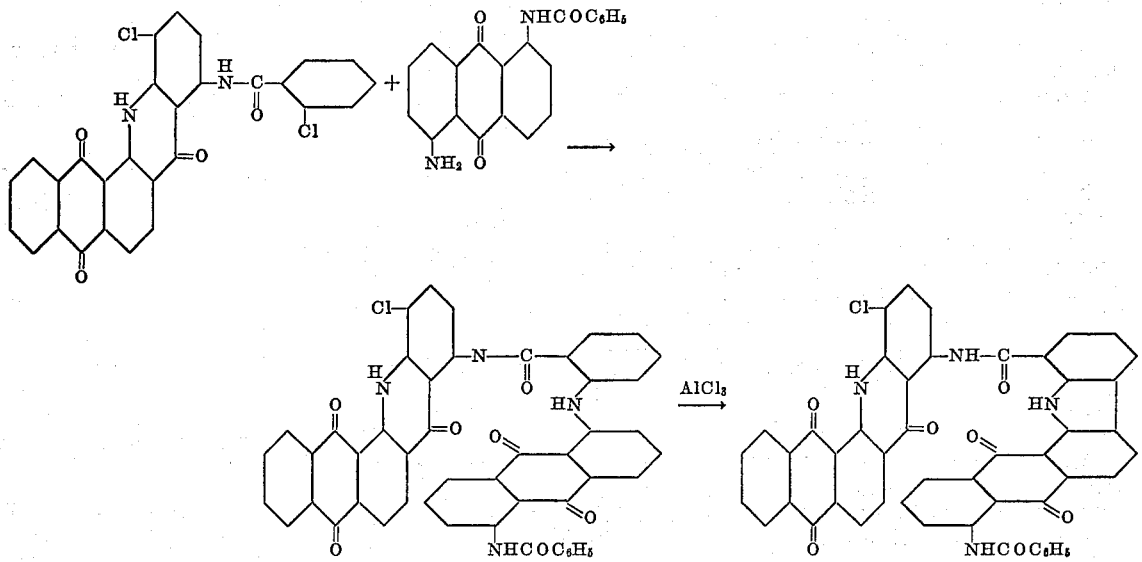

Examples of compounds embraced by the above general formula are the following. For the sake of brevity, the nomenclature subsequently employed is based on the formulae given.

1.
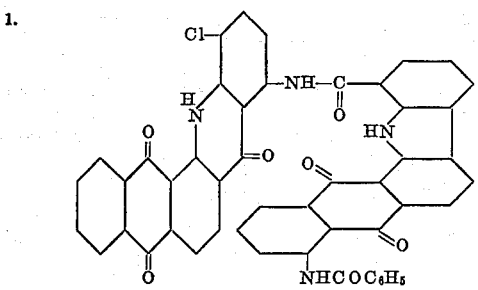

2.
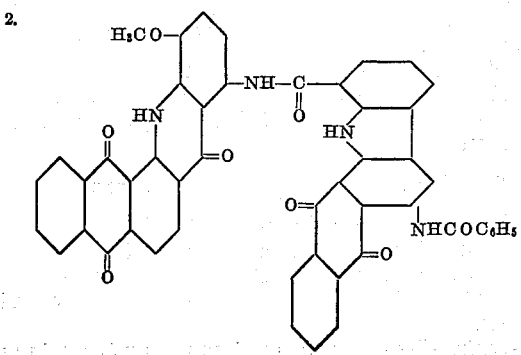

3. The compound is the same as that of Formula 1 excepting that the 3'-position is unsubstituted.

4. The compound is the same as that of Formula 1 excepting that the 7''-position is unsubstituted.

5. The compound is the same as that of Formula 2 excepting that the 4'-position is substituted by methoxy.

6. The compound is the same as that of Formula 1 excepting that the 3'- and 4'-positions are substituted by chloro.

7. The compound is the same as that of Formula 2 excepting that the 3'- and 4'- positions are substituted by chloro.

8. The compound is the same as that of Formula 1 excepting that the 3'-position is substituted by phenyl.

9. The compound is the same as that of Formula 2 excepting that the 3'-position is substituted by phenoxy.

10. The compound is the same as that of Formula 1 excepting that the 3'-position is substituted by bromine.

11. The compound is the same as that of Formula 1 excepting that the 4'-position is substituted by phenyl.

12. The compound is the same as that of Formula 1 excepting that the 3'-position is substituted by ethyl.

13. The compound is the same as that of Formula 2 excepting that the 3'- and 4'-positions are substituted by methyl.

14. The compound is the same as that of Formula 1 excepting that the 4'-position is substituted by propyl.

The following examples serve to illustrate the invention, the parts being by weight unless otherwise stated. It is understood that the following are exemplary and not limitative of the invention.

*Example I*

A mixture of 10 parts of anthraquinone-2.1-(N) - 1',2' - (N) - 3' - chloro-6'-(o-chlorobenzoylamido)-benzacridone 5.5 parts of 1-amino-5-benzamido anthraquinone
120 parts of nitrobenzene
5 parts of soda ash
.5 part of copper acetate are stirred at 208 to 210° C. for 20 hours. The solution is then cooled to 30° C. The condensation product is isolated by filtration. The dark crystalline product is washed with alcohol, dilute hydrochloric acid and water. The product dyes cotton strong violet shades from a violet vat.

For carbazolation, 9.6 parts of the above condensation product are dissolved in a solution of
36 parts of anhydrous aluminum chloride and
145 parts of nitrobenzene and stirred while heating to 50° C. for 3 hours. The reaction mixture is poured into dilute hydrochloric acid, the nitrobenzene is removed by steam distillation, and the dyestuff is isolated by filtration. Cotton is dyed by the product from a hydrosulfite vat in bright red-brown shades of excellent fastness properties.

*Example II*

The procedure is the same as in Example I excepting that the 1-amino-5-benzamido anthraquinone is replaced by 1-amino-4-benzamido anthraquinone.

*Example III*

The procedure is the same as that of Example I excepting that the 1-amino-5-benzamido anthraquinone is replaced by 1-amino-anthraquinone.

*Example IV*

The procedure is the same as in Example I excepting that the anthraquinone-2.1-(N)-1'.2'-(N)-3'-chloro-6'-(o-chlor-benzamido)-benzacridone is replaced by anthraquinone-2.1-(N)-1'.2'-(N)-3'-phenyl-6'-(o-chloro benzamido)-benzacridone.

Similar compounds are obtained by utilizing other of the benzacridones mentioned above in place of that specifically stated in Example I.

*Example V*

A mixture of 7.2 parts of anthraquinone-2.1-(N)-1'.2'-(N)-3'-methoxy-6'-(o-chlorbenzamido) - benzacridone
4.2 parts of 1-amino-4-benzamino anthraquinone
4 parts of soda ash
1 part of copper acetate, and
108 parts of nitrobenzene are heated at 205° C. for 15 hours. The dark precipitate which results is removed by filtration, washed with ethanol, dilute hydrochloric acid and water. The dyestuff yields strong blue gray dyeings on cotton from a violet vat.

To effect carbazolation, 7 parts of the above condensation product are dissolved in a solution of
33 parts of aluminum chloride in 120 parts of nitrobenzene and the solution stirred for 3 hours while heating the same to 50° C. The dyestuff is then isolated as in Example I. The product dyes cotton powerful violet gray shades from a violet vat, the dyeings possessing excellent fastness properties.

*Example VI*

The procedure is the same as that of Example V excepting that the anthraquinone-(N)-1'.2'-(N)-3'-methoxy-6'-(o-chlorbenzamido) - benz- acridone is replaced by the corresponding 3'-ethyl derivative.

Modifications of the invention will occur to persons skilled in the art and I therefore do not intend to be limited in the patent granted except as required by the prior art and the appended claims.

We claim:

1. Vat dyes having the following formula:

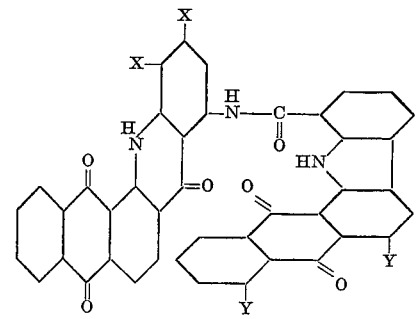

wherein X is a member selected from the class consisting of hydrogen, alkyl, alkoxy, aryl, aryloxy and halogen and Y is a member selected from the class consisting of hydrogen and a benzamido radical.

2. A vat dye of the following formula:

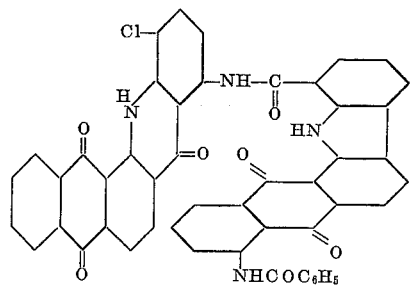

capable of dyeing cotton from a hydrosulfite vat in bright red-brown shades of excellent fastness properties.

3. A vat dye of the following formula:

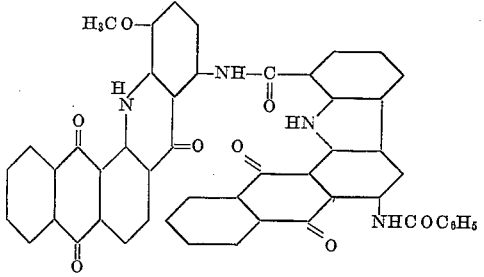

which dyes cotton from a hydrosulfite vat in beautiful violet-gray shades of excellent fastness properties.

FRITZ MAX.
DAVID I. RANDALL.

REFERENCES CITED

The following references are of record in the file of this patent:

UNITED STATES PATENTS

| Number | Name | Date |
|---|---|---|
| 2,242,411 | Bauer | May 20, 1941 |